United States Patent [19]

Turner et al.

[11] 4,027,975
[45] June 7, 1977

[54] SCANNING MONOCHROMATOR AND CONCAVE REFLECTING GRATING EMPLOYED THEREIN

[75] Inventors: David Turner, London; Robert John Speer, Reading, both of England

[73] Assignee: National Research Development Corporation, London, England

[22] Filed: May 27, 1975

[21] Appl. No.: 580,920

[30] Foreign Application Priority Data

May 28, 1974 United Kingdom ............. 23688/74

[52] U.S. Cl. ........................... 356/100; 350/162 R
[51] Int. Cl.² ....................... G01J 3/18; G02B 5/18
[58] Field of Search .......... 350/162 R; 356/98–101, 356/79

[56] References Cited

UNITED STATES PATENTS

| 3,384,756 | 5/1968 | Hasler et al. | 356/79 X |
| 3,495,909 | 2/1970 | Axelrod | 356/79 X |
| 3,523,734 | 8/1970 | Brehm et al. | 356/98 X |
| 3,628,015 | 12/1971 | Franks | 356/79 X |

*Primary Examiner*—John K. Corbin
*Assistant Examiner*—F. L. Evans
*Attorney, Agent, or Firm*—Rose & Edell

[57] ABSTRACT

A scanning monochromator or spectrometer having a reflecting grating whose curvature in the meridian plane is equal to the curvature of a circle upon which the source, detecting means and grating lie and whose lines are ruled with a frequency which varies systematically and directly in proportion to the distance of the lines from a point of origin on the track as determined by the geometry of the equipment, and gratings therefor.

20 Claims, 7 Drawing Figures

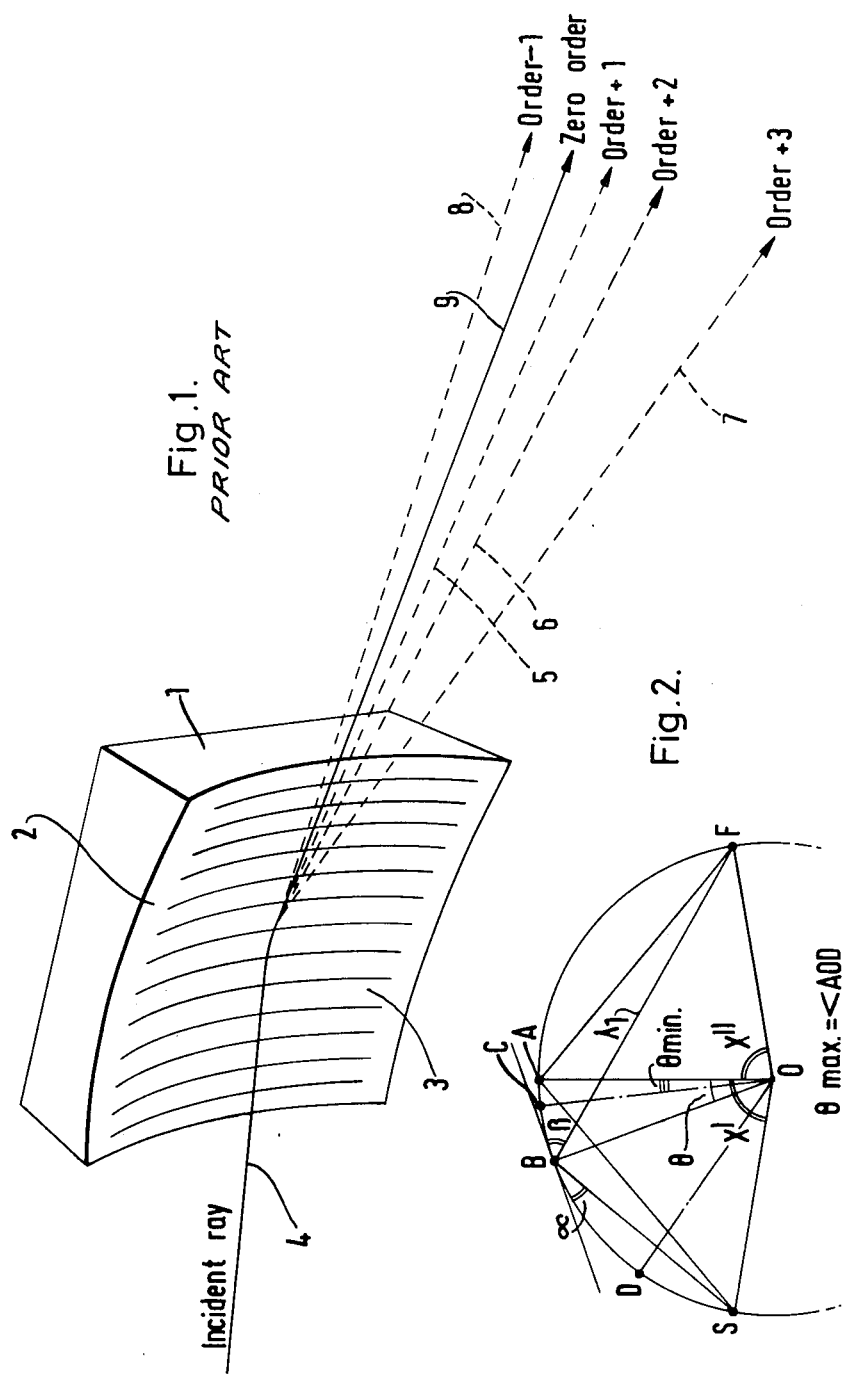

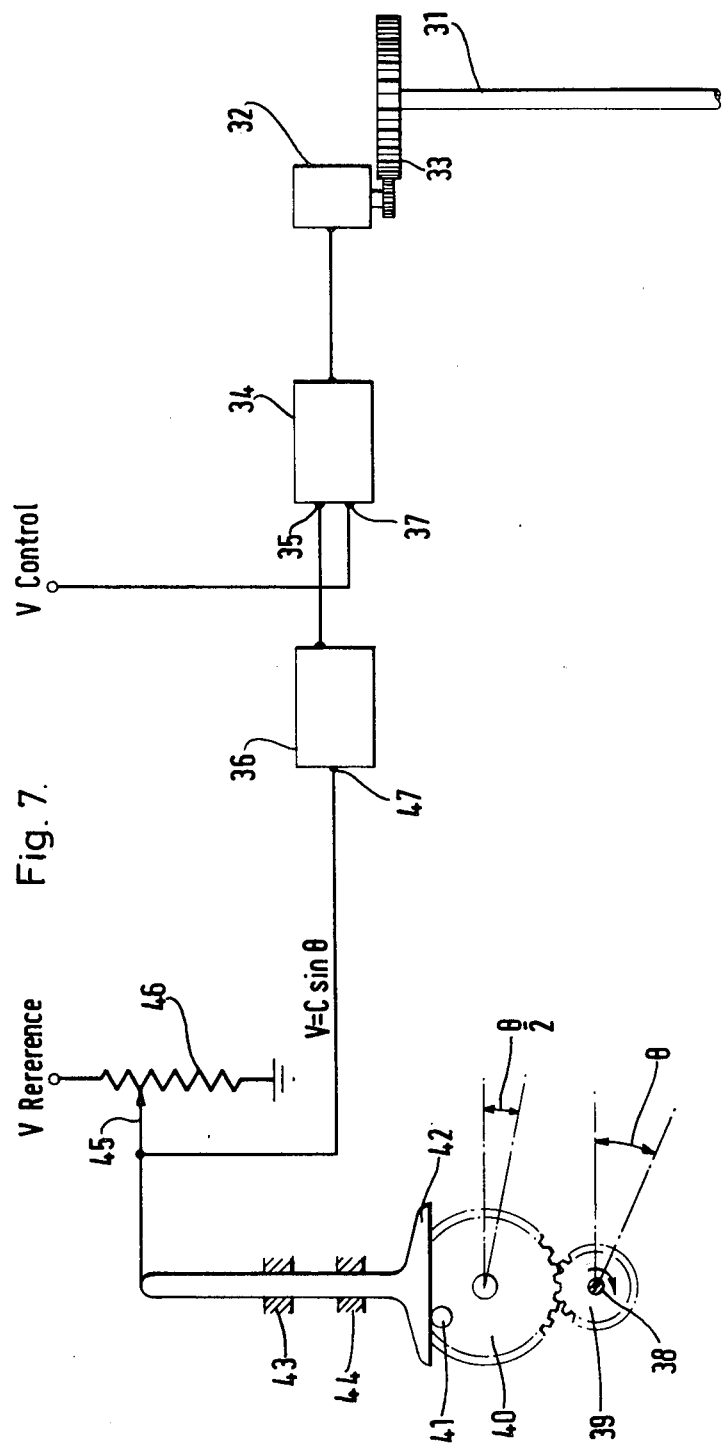

SCANNING MONOCHROMATOR AND CONCAVE REFLECTING GRATING EMPLOYED THEREIN

BACKGROUND OF THE INVENTION

In the most common form of scanning monochromator (used for example in spectrometers for the analysis of electromagnetic radiation), when the dispersing element is a concave spherical grating the instrument construction and grating thereof are based on Rowland's principles. The grating is a part of a sphere and has lines ruled across its concave surface which, when projecting onto a plane surface, are straight, parallel and equidistant. The entrance slit or source, the grating, and the detector (or exit slit, photographic plate or observing telescope) are positioned around the circumference of a circle whose diameter is equal to the radius of curvature of the grating. The grating is relatively short and arranged tangentially to the said circle, called hereinafter the Rowland circle with the ruled lines at right angles to the plane of the circle. Such instruments have broad band properties but the imaging is not perfect, even in the meridian plane for small gratings, and it deteriorates rapidly as the grating is extended in length to increase its light grasp (or angular aperture). The aberrations lower spectral resolution and intensity; thus relatively long detection times are necessary.

The greatest care has to be taken in the ruling of the lines on the grating. The performance of the grating is dependent upon the limitations of the ruling engine. Irregularities (random errors) and systematic variation in the spacing across the grating surface are considered to constitute serious faults. B. Gale states in his article entitled "The Theory of Variable Spacing Gratings" (Optica Acta 1966 Vol. 13 No. 1, pages 41–54) that although a variable spacing of the lines on a plane grating may provide improved focussing properties, in the case of a concave spherical grating no such improvement can be obtained by any choice of ruling pattern. We have made the surprising discovery however that a choice of spacing of the lines on a spherical or toroidal grating will provide better imaging if the focussing geometry in which it is used is modified from the given by Rowland's principles.

Accordingly it is an object of the present invention to provide a new and improved scanning monochromator, which may for example be used as part of a spectrometer. It is a further object of the invention to provide a scanning monochromator having a spherical or toroidal reflecting grating in which the spacing of the lines on the grating is varied, being chosen to provide improved and enhanced imaging of the source.

SUMMARY OF INVENTION

Thus a scanning monochromator according to our invention comprises a reflecting grating having on a concave surface thereof lines which perpendicularly intersect the meridian plane of the grating, source means for providing electromagnetic radiation to irradiate said grating, radiation receiving means for receiving radiation from said source means which has been diffracted by said grating, and means for effecting relative movement between said grating, said source means and said radiation receiving means such that given points of said source means and said radiation receiving means always lie on a circle in said meridian plane which touches said concave surface, characterised in that the radius of curvature of said concave surface in the meridian plane is equal to the radius of said circle, the grating line frequency varies systematically along the grating, and said means for effecting relative movement comprises means for causing said given points to be maintained at equal distances from a point of origin on said circle which is spaced from and fixed relative to said grating. The radius of the said circle is thus twice the radius of the equivalent Rowland circle.

According to a further aspect of the invention the line frequency at any point along the grating is linearly proportional to the sine of half the angle subtended at the centre of curvature of the grating between that point and a fixed origin, called herein the point of origin. In the meridian plane radiation of a given wavelength from a point source on the circumference of the new circle will be focussed, after diffraction from the surface of the grating, at another point on the circle. In this case, unlike the performance of instruments based on Rowland's principles, the focussing is perfect within the limitations or geometric optics. Spherical aberration is zero and the magnification unity, no matter how far the grating is extended around the circle. The images can therefore be strong and the sensitivity of the instrument increased because there is in theory no limit to the angular aperture of the grating.

Against this benefit must be set the fact that only one wavelength can be focussed at any one time; thus once the grating has been made, then for each wavelength within the working range there is a unique point on the circle for the source and a corresponding unique point for the geometrical perfect focus. Equally, with the same grating and the source at a given position, the radiation of all wavelengths except one reach the circumference of the circle as progressively defocussed and angularly displaced patches with proportionally lower intensities. By limiting the extent of the grating, in particular by excluding the portion where the line frequency approaches and becomes zero, a unique imaging point can be found on the circle where there is radiation of only one wavelength. Thus, with an instrument having the new grating considerably improved results are obtained over an instrument based on Rowland's principles. Furthermore, with variable mountings of the source and detector around the fixed circle the instrument may also be adjusted to transmit radiation of a variable small bandwidth.

BRIEF DESCRIPTION OF DRAWINGS

Hereinafter the invention is described both theoretically and by way of example with reference to the accompanying drawings, wherein:

FIG. 1 is a diagrammatic illustration of a prior art spherical grating;

FIG. 2 is a geometric construction illustrating the derivation of the line spacing of the preferred grating of the invention;

FIG. 7 shows a mechanism for ruling a grating according to the law $N = K \sin(\theta/2$.

THEORETICAL DERIVATION OF INVENTION AND PRACTICAL CONSIDERATIONS

Figure 3:
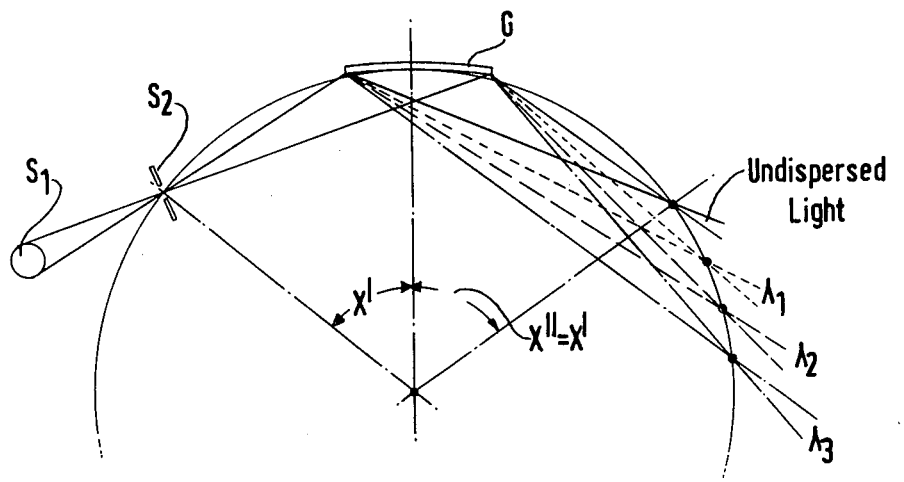
FIGS. 3 and 4 show diagrammatically a comparison between the results obtained in an instrument embodying Rowland's principles and those obtained in an instrument embodying the present invention.

Referring now to the drawings, particularly in respect of FIG. 1, a grating typically comprises a plate 1 having a concave reflecting surface 2. This surface may be spherical or it may be toroidal with the curvature in the meridian plane being less than the curvature in a plane perpendicular to the meridian plane. In the prior art grating the radius of curvature in the meridian plane was made twice the radius of curvature of the track, i.e. the Rowland circle, and the line spacing 3 was uniform when projected onto a plane surface. From such a grating an incident ray 4 of monochromatic radiation is diffracted into a plurality of paths such as 5, 6, 7 and 8 in FIG. 1, known as Order +1, Order +2, Order +n, and also Order −1 respectively. Each of these paths will change with the wavelength of the incident radiation. Path 9 also shown in FIG. 1 is known as the zero order path and constitutes the path taken by specularly reflected radiation of any wavelength. In the prior art spectrometer or scanning monochromator the source means, the grating and the detector or viewing means were all arranged on a circle whose diameter was equal to the radius of curvature of the grating in the meridian plane.

The circle in FIG. 2 represents the meridian plane of the reflecting inner concave surface of a grating according to the invention. Light from a point S which strikes point A will, according to the law of reflection, be reflected to point F such that $x' = x''$, where $x'$ and $x''$ are the angles subtended at the geometric center 0 of the circle by segments of the circle SA and AF.

The surface is assumed to be ruled with lines, perpendicularly to the plane of the Figure, with increasing frequency over the region from A to B and beyond, the frequency being zero at point A. Segment AB subtends an angle $\theta$ at the center 0 of the circle.

Assuming that light of wavelength $\lambda_1$ is diffracted from point B so as to strike point F, then from the grating equation:

$$d = \frac{m\lambda_1}{\cos\alpha - \cos\beta}$$

$$= \frac{m\lambda_1}{\cos\left(\frac{x'}{2} - \frac{\theta}{2}\right) - \cos\left(\frac{x'}{2} + \frac{\theta}{2}\right)} \quad \text{(by Euclidean geometry)}$$

or $d = \dfrac{m\lambda_1}{2 \sin \frac{x'}{2} \sin \frac{\theta}{2}}$ where $d$ is the distance between the lines on the surface, $m$ is a constant, $\alpha$ is the angle between the incident ray and the tangent to the grating surface at the point of incidence and $\beta$ is the angle between the diffracted ray and the same tangent.

However, $d = 1/N$ where $N$ is the line frequency. hence $$N = \frac{2 \sin \frac{x'}{2} \sin \theta}{m\lambda_1}$$

Because $x'$ is fixed for all the rays of wavelength $\lambda_1$ diffracted from the surface to pass though point F, N must vary linearly with sin $(\theta/2)$, i.e. $N = K \sin (\theta/2)$ where $$K = \frac{2 \sin \frac{x'}{2}}{m\lambda_1}$$

The ruled surface therefore has a curvature which is coincident with the mounting circle of the source and detector and it has a line frequency which varies progressively around the circle, which is a minimum at the point nearest the location A on the circle, and which is a maximum at a point on the circle diametrically opposite to location A. By varying the value of K gratings can be computed suitable for use in any wavelength region.

For any given grating, once manufactured, the value of K is fixed. The wavelength $\lambda$ focussed may then be selected by calculating the angle $x'$ for the source position from:

$$x' = 2 \sin^{-1} \frac{Km\lambda}{2}$$

The chosen wavelength $\lambda$ will be focussed at point F on the circle where $\theta_F = 360° - x'$.

Alternatively for a known value of $x'$, the wavelength $m\lambda$ focussed is given by:

$$m\lambda = \frac{2 \sin x'/2}{K}$$

The maximum diffracted wavelength that can be focussed at all with a given grating is thus $2/K$ when $x = 180°$.

At point A on the circle the line frequency of the grating is theoretically zero; therefore only specular reflection takes place there, so that wavelengths other than $\lambda_1$ will be reflected to point F. For this reason a practical grating is not extended into the region where such reflections can take place and are likely to prove a nuisance. The region between point A and point F also is not used so as to prevent unfocussed light falling directly upon point F. From these considerations it is seen that the position of the edge C of a practical grating nearest to point A is a compromise, being preferably between points A and S. This position is defined by an angle $\theta$ min.

The choice of $\theta$ max, i.e. the position of that edge D of the rating furthest away from point A, requires a correct balance between conflicting requirements. The larger $\theta$ max can be made the larger the grating and the higher the numerical aperture and transmission of the instrument. In a practical instrument, however, $\theta$ max cannot conveniently be made larger than $x'$ because the grating will obscure the source. Of course the position of point S depends upon the wavelength being examined but a limit to $\theta$ occurs irrespective of the wavelength at $\theta$ max = 90°. At this point the line spacing $d$ of the grating is equal to the wavelength focussed when $x' = 90°$ and is smaller than the wavelengths focussed from a source at any greater value of $x'$. The intensity of the diffracted rays is therefore negligible. Consequently only the quadrant of the grating surface lying between $\theta =$ zero and $\theta = 90°$ need be considered.

Problems associated with the manufacture of the gratings also limit the size thereof and since a fairly large instrument having a mounting circle diameter in the region of 1 or more meters is desirable in order to provide for a reasonable dispersion of the spectrum, it is found that the grating length in a practical instrument is only a small fraction of the quadrant. In spite of such limitations a spectrometer or monochromator based on the principles disclosed herein may have a wavelength range and numerical aperture considerably greater than that found with instruments based on Rowland's principles.

As can be seen from the foregoing equations, the transmitted wavelength, and the frequency of the lines on the grating are independent theoretically of the diameter of the mounting circle. In practice, however, the diameter will to some extent depend upon the transmitted wavelength because of the need for an adequate spread of the imaged spectrum, which in turn depends upon the wavelength.

It should be noted moreover that the diffraction process is described herein by the simple equations of geometrical optics. This approximation is only valid for line spacings $d$ lying between the approximate limits of 10 and $10^4$ wavelengths.

For $2\lambda > d \gtrsim \lambda/10$ very complex image phenomena will appear, only properly described by Wave Optics and the equations of Electromagnetic Theory. Therefore it may be desirable to avoid regions of the grating for which $d \gtrsim \lambda/10$ in a practical design. This limitation applies throughout the electromagnetic spectrum and therefore the size of a grating (and consequently an instrument) will be very different for say, X-rays of wavelengths 1 nanometer and infra-red of wavelength 1 millimeter.

In FIG. 3 there is shown diagrammatically apparatus based upon Rowland's principles. A spherical grating G having lines which are equally spaced when projected onto a plane surface is arranged tangentially to a Rowland circle. The latter constitutes the mounting locus of the source and detector. Radiation actually emanates from a sorce $S_1$ but is collected through an entrance slit $S_2$ arranged on the locus of the circle. This slit is therefore the radiation source as seen from the grating. The radiation indicated by the solid line is undispersed; it may be, for example, white light and constitutes the zero order path. Radiation successively indicated by the chain dotted lines, the dash lines, and the dash and dot lines indicate radiation of different wavelengths and are seen brought to a focus on the circumference of the circle. This circle has a radius which is half the radius of curvature of the grating surface.

Figure 4:
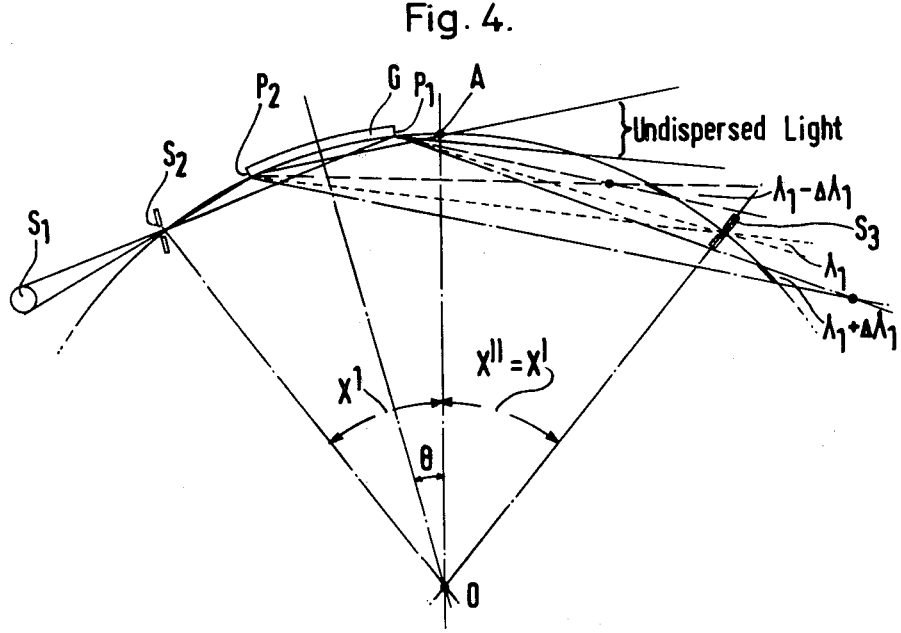

FIG. 4 shows diagrammatically a scanning monochromator based upon the principles of the present invention. As before, the source, as seen from the grating, is an entrance slit $S_2$ positioned on the locus of a circle having a center but in this case the circle has the same curvature as the grating and the grating is arranged on the circle with its edge $P_1$ spaced away from the point of origin A, towards the entrance slit. In accordance with the invention the line frequency around the grating varies from a minimum at location $P_1$ to a maximum at locations $P_2$ and it varies according to the derived law $N = K \sin(\theta/2)$. The chain dotted lines indicate radiation of wavelength $\lambda_1$. It is seen that this radiation is focussed precisely upon the circumference of the circle. Radiations of other wavelengths however do not focus at this circumference. This is shown in the diagram in relation to two wavelengths which differ from the wavelength $\lambda_1$ by a small amount $\Delta\lambda_1$. The property of the present invention to focus a chosen, unique, wavelength is independent of the numerical aperture of the particular apparatus.

In the practical instrument an exit slit will be arranged at the focal point of the wanted radiation, i.e. radiation $\lambda_1$, thereby excluding from the detector the unfocussed radiation.

In FIG. 4 an exit slit $S_3$ is shown, positioned to transmit radiation only of wavelength $\lambda_1$. If both the entrance and exit slits are infinitesimally narrow, the emerging radiation will be monochromatic, though of infinitesimal intensity. With practical widths of slit a narrow range of wavelengths will be transmitted and the band width can be varied by adjusting the width of the slits.

The two slits $S_2$, $S_3$ must be symmetrically disposed on either side of the axis which passes through the point A on the circle at which a ray received from the entrance slit will be reflected to the exit slit. This point is called the origin. (If the grating extended to this point the line frequency would be zero). Adjustment to vary the transmitted wavelength may be provided by means of linkage constraining the two slits to move at equal rates in opposite directions around the circumference of the circle, the grating being fixed relative to the origin. Suitable linkages for this purpose already exist in reflectometers which require the same relative movements. A equivalent movement may be provided also by fixing one of the slits, traversing the grating around the circle at one speed and traversing the other slit in the same direction at twice the speed. The slits (and the radiation source) must be rotated as they move around the circle so that they continue to face the grating whatever their position. This movement may be provided by mounting the slit frames on bearings so that the center line of the slit is in line with the axis of rotation and by providing rods pivoted at the grating upon which the slit frames slide, there being slideways provided therein, arranged at the appropriate angle to ensure that each slit always faces the grating.

DESCRIPTION OF PREFERRED EMBODIMENT

Figure 5:
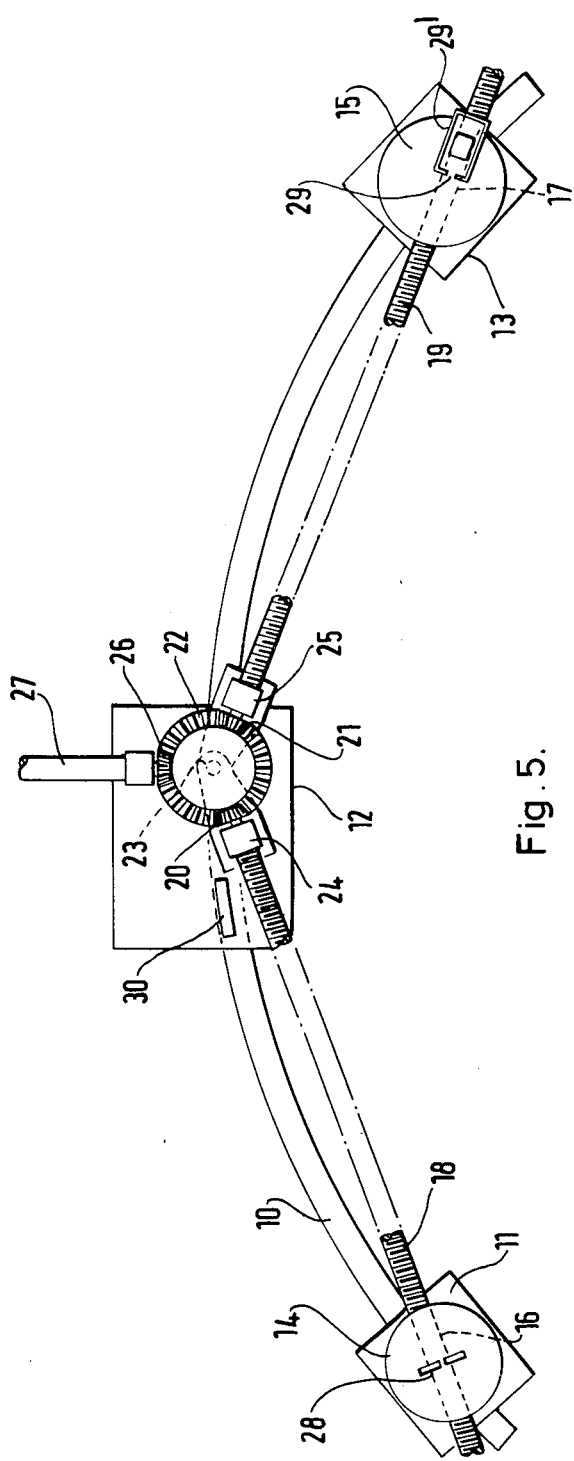
FIG. 5 shows diagrammatically a spectrometer according to the present invention.

Referring now to FIG. 5, a spectrometer according to the invention comprises an arcuate track 10 which may be completely circular but will usually be of more limited length as shown. Positioned along the track are respectively source carriage 11, grating carriage 12, and detector carriage 13. Each carriage may be movable along the track 10 and provision is made (not shown) for locking them individually in position thereon. In some applications one or other of the carriages may be permanently fixed (usually the source carriage), otherwise in normal use one carriage is locked to suit the convenience of the user and the other two left free whilst adjustments and/or measurements are carried out. Of course, during particular measurements, all three carriages may be locked in position on the track.

The three carriages are mechanically linked by a lead screw translating arrangement. This the source and detector carriages 11 and 13 each have mounted thereupon a swelling turret, 14 and 15, each having a threaded bore 16, 17 receiving a respective lead screw 18, 19. These lead screws are respectively right and left hand threaded and have bevel pinions 20, 21 at their inner ends which engage with a crown wheel 22 rotatably supported upon the grating carriage 12 and having a rotation axis 23; the axis 23 perpendicularly intersects the path along which the carriages are movable at a point which defines the origin (or notional pole) of the apparatus. Each lead screw is also supported at its inner end in a pivoted bearing 24, 25 such that it pivots about the rotational axis 23 of the crown wheel 2. A further bevel pinion 26 mounted for rotation with a drive shaft 27 engages the crown wheel 22 and provides a drive therefor.

Upon the turret 14 of the source carriage 11 there is provided a suitable source of electromagnetic radiation, which may comprise, for example, a slit 28 upon which radiation falls or a self-radiating sample such as that used in electron microprobe analysis. Upon the turret 15 of the detector carriage 13 there is provided a suitable exit slit 29 behind which is mounted an electronic photon detector 29'. Between the two turrets and mounted upon the grating carriage 12, is a grating 30. The slits 28 and 29 are disposed centrally with respect to the meridian plane of the grating 30. Rotation of the drive shaft 27 in one direction, therefore, moves the carriages 11 and 13 away from the carriage 12 whilst rotation of the drive shaft 27 in the other direction moves the carriages 11 and 13 towards the carriage 12. If the grating carriage is locked on the track, the source and detector carriages will correspondingly move along the track. If the source carriage is locked to the track instead, then the grating carriage and the detector carriage will move in the same direction, the former at half the speed of the latter.

More generally, a scanning monochromator according to the invention has the same track and mechanical arrangements. If differs in that the detector 29' is omitted so that the exit slit 29 itself acts as a source of radiation of small bandwidth, which may be used for any desired purpose.

Figure 6:
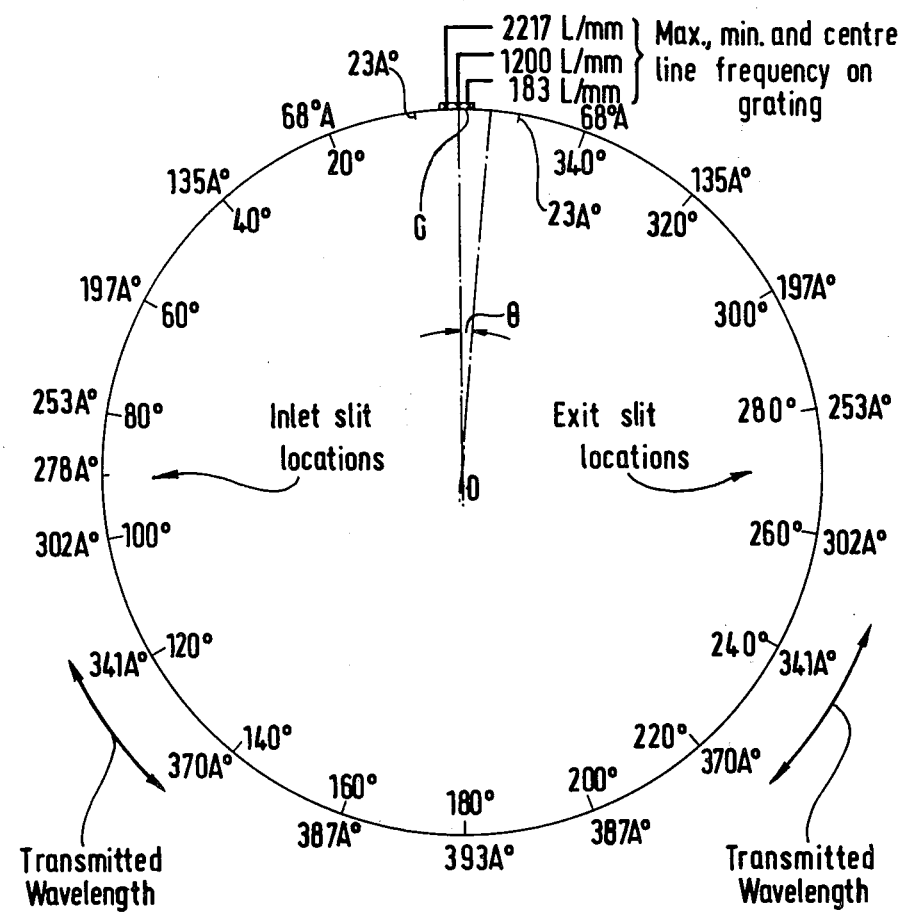
FIG. 6 shows the calibration of a typical instrument embodying the present invention.

FIG. 6 shows diagrammatically the geometric layout of an instrument having a grating designed on the basis of the law $N = K \sin (\theta/2)$ for use at a minimum wavelength of 23 Angstrom units and a full-circle track. The wavelength of 23 Angstom units lies in the grazing incidence, soft X-ray region. The incidence angle $\alpha$ and the line frequency N were therefore fixed arbitrarily at 2° and 1,200 lines/mm respectively at the center of the grating and the radius of curvature chosen as 2.5 meters to fit an existing instument. The length of the grating was 200 mm. This gave values of $\theta$ of 2.705° at the centre of the grating, 0.412° and 4.997° at the two ends and the value of K of 50848$A^{-1}$. The values of N were, therefore, 183 lines/mm at the end of the grating nearest the origin and 2,217 linesmm at its other end nearest the entrance slit.

With the grating fixed the inlet and outlet slits swing in opposite directions around the circle to change the wavelength transmitted from 23 Angstrom at $x' = 6.705°$ where $\alpha = 2°$ at the centre of the grating, to 387 Angstroms at $x' = 160°$ where $\alpha = 78.6°$. This last location of the slits is the practical maximum since the inlet and exit slits cannot occupy the same position and the mountings of the two slits prevent them from approaching more closely.

The instrument described in relation to FIGS. 5 and 6 has precisely specified geometric parameters; i.e. a mounting circle having precisely the same locus at the grating and precisely calculable positions for the inlet and exit slits for a given rate of change of line frequency along the grating. These results are obtained, however, at the expense of using the somewhat complicated law $N = K \sin (\theta/2)$ for positioning lines on the grating. For relatively short gratings disposed near the origin A this law is approximated by the law $N = K' (\theta/2)$ and therefore quite acceptable results may be obtained with such a grating by having a line spacing which varies linearly with the distance along the tangent from the origin A of the mounting circle. In a practical instrument the angular aperture of a grating with linearly varying line spacing is limited so that the maximum value of $\theta$ does not exceed about 10°. With larger numerical apertures defocussing effects become noticeable and these effects also occur as the range of wavelengths depart from the optimum value, necessitating the adjustment of the entry and exit slits to a slightly different locus to that of the track. Even with these limitations, however, instruments are possible having numerical apertures of some five to ten times greater than those available before and, if the range of wavelengths be limited also, then the departure of the entry and exit slit mounting locus from the circle containing the grating can become negligible.

Of course it is important in an instrument in accordance with the present invention, just as in the case of the instrument based on Rowland's principles, for the lines on the gratings to be accurately positioned and spaced. Most ruling engines use an accurately constructed lead screw which draws the cutting stylus across the grating whilst the latter is reciprocated backwards and forwards to generate the grating pattern. The same arrangement cannot be easily used to rule lines whose spacing systematically varies along the grating. For systematic variation of the line spacing, individual values may be calculated digitally and set for example by means of a stepping motor via a suitable gear train. FIG. 7 shows an analogue mechanism for stepping the lead screw 31 so as to obtain, for example, the preferred ruling law $N = K \sin (\theta/2)$ The lead screw is directly positioned by means of a stepping motor 32 via a gear train 33, the stepping motor being itself controlled by a logic circuit 34 having a first input 35 connected to receive the digital output of an analogue to digital converter 36 and and a second input 37 connected to receive a master control and correction input to allow for changes in ambient conditions. A linear input representing angle $\theta$ is provided by rotating a shaft 38 upon which is mounted a gear 39 which meshes with a driven gear 40 having twice as many teeth. Upon gear 40 is an accentric peg 41 which engages a reciprocating follower 42. Follower 42 is mechanically constrained to slide up and down by guides 43, 44 and is connected to the slider 45 of an electrically energised potentiometer 46. Slider 45 is electrically connected to the analogue input 47 of the analogue to digital converter 36. To use the mechanism, the operator initially sets shaft 38 in an angular position corresponding to $\theta$ min, and positions the ruling stylus at the edge of the grating which will be nearest the origin of the instrument. After each line is ruled the shaft 38 is automatically turned through an equal increment corresponding to the required increment of $\theta$, for example by another stepping motor drive (not shown). The linear movement of the follower 42 then corresponds to $\sin (\theta/2)$ and is converted to a proportional voltage by energised potentiometer 46.

It will be appreciated by those skilled in the art that the embodiment of the spectrometer and the monochromator, and the mechanism for driving a grating ruling engine, may take other forms within the scope of the invention than those disclosed in this description.

We claim:
1. A scanning monochromator comprising a reflecting grating having on a concave surface thereof lines which perpendicularly intersect the meridian plane of the grating, source means for providing electromagnetic radiation to irradiate said grating, radiation receiving means for receiving radiation from said source means which has been diffracted by said grating, and means for effecting relative movement between said grating, said source means and said radiation receiving means such that given points of said source means and said radiation receiving means always lie on a circle in said meridian plane which touches said concave surface, characterised in that the radius of curvature of said concave surface in the meridian plane is equal to the radius of said circle, the grating line frequency varies systematically along the grating, and said means for effecting relative movement comprises means for causing said given points to be maintained at equal distances from a point of origin on said circle which is spaced from and fixed relative to said grating.

2. A monochromator according to claim 1 wherein the grating line frequency $N$ is specified by the law $N = K \sin(\theta/2,)$ where $K$ is a constant and $\theta$ is the angle subtended at the centre of said circle by said point of origin and the point on the grating in the meridian plane where the line frequency is being considered.

3. A monochromator according to claim 2 wherein the concave surface of the grating has a radius of curvature in a plane perpendicular to the meridian plane which is equal to the radius of curvature in the meridian plane.

4. A monochromator according to claim 2 wherein the concave surface of the grating has a radius of curvature in a plane perpendicular to the meridian plane which is less than the radius of curvature in the meridian plane.

5. Apparatus according to claim 1, wherein the grating line frequency $N$ is specified by the law $N = K'(\theta/2)$ and the maximum value of $\theta$ at any point on the grating does not exceed about 10°, where $K'$ is a constant and $\theta$ is the angle subtended at the centre of said circle by said point of origin and the point on the grating in the meridian plane where the line frequency is being considered.

cave surface of the grating has a radius of curvature in a plane perpendicular to the meridian plane which is equal to the radius of curvature in the meridian plane.

7. Apparatus according to claim 5 wherein the concave surface of the grating has a radius of curvature in a plane perpendicular to the meridian plane which is less than the radius of curvature in the meridian plane.

8. In a scanning monochromator having an arcuate track and a concave reflecting grating whose curvature along the meridian plane is the same as that of the arcuate track and whose line frequency varies systematically along the grating:
 a. a source means comprising a first saddle mounted upon the track for sliding movement therealong;
 b. a radiation receiving means comprising a second saddle mounted upon the track for sliding movement therealong;
 c. first and second leads screws;
 d. first and second swivelling turret means respectively mounted upon the first and second saddles each apertured with a threaded bore to receive respectively the first and second lead screw, said lead screws and said bores having threads of opposite hand;
 e. a grating saddle also mounted upon the track between the said first and second saddles, said grating saddle having the grating mounted thereon;
 f. a gear mechanism mounted upon the grating saddle, said gear comprising an input shaft bearing a first bevel pinion, a crown wheel mounted for rotation upon the grating saddle which crown wheel is engaged by said first bevel pinion, second and third pinions mounted respectively upon the said first and second lead screws for rotation therewith and also engaging said crown wheel, and first and second lead screw bearing means for supporting the said lead screws so that the latter are capable of swivelling about the rotational axis of the crown wheel.

9. A monochromator according to claim 8 wherein the source means comprises optical slit members mounted upon the said first turret.

10. A monochromator according to claim 8 wherein the radiation receiving means comprises an electronic radiation defecting means mounted upon the said second turret.

11. A monochromator according to claim 8 wherein the grating line frequency $N$ is specified by the law: $N = K \sin(\theta/2,)$ where $K$ is a constant and $\theta$ is the angle subtended at the centre of curvature of the grating in the meridian plane of the grating by the point on the grating where the line frequency is being considered and by the point of origin of the monochromator.

12. A monochromator according to claim 8 wherein the grating line frequency $N$ is specified by the law $N = K'(\theta/2)$ and the maximum value of $\theta$ at any point on the grating does not exceed about 10°, where $K'$ is a constant and $\theta$ is the angle subtended at the centre of curvature of the grating in the meridian plane of the grating by the point on the grating where the line frequency is being considered and by the point of origin of the monochromator.

13. A concave reflecting grating having a meridian plane which intersects the reflecting surface of the grating perpendicularly to the lines of the grating with the intersection being an arc of a circle, the grating having a line frequency $N$ which is specified by the law $N = K \sin(\theta/2,)$ where $K$ is a constant and $\theta$ is the angle subtended at the centre of said circle by the point on the grating in said plane at which the line frequency is being considered and a fixed point on said circle spaced from the grating.

14. A concave reflecting grating according to claim 13 wherein the concave surface of the grating has a radius of curvature in a plane perpendicular to the meridian plane which is equal to the radius of curvature in the meridian plane 15. A concave reflecting grating according to claim 13 wherein the concave surface of the grating has a radius of curvature in a plane perpendicular to the meridian plane which is less than the radius of curvature in the meridian plane.

16. A concave reflecting grating having a meridian plane which intersects the reflecting surface of the grating perpendicularly to the lines of the grating with the intersection being an arc of a circle, the grating having a line frequency $N$ which is specified by the law $N = K'(\theta/2)$ and the maximum value of $\theta$ at any point on the grating does not exceed about 10°, where $K'$ is a constant and $\theta$ is the angle subtended at the centre of said circle by the point on the grating in said plane at which the line frequency is being considered and a fixed point on said circle spaced from the grating.

17. A concave reflecting grating according to claim 16 wherein the concave surface of the grating has a radius of curvature in a plane perpendicular to the meridian plane which is equal to the radius of curvature in the meridian plane.

18. A concave reflecting grating according to claim 16 wherein the concave surface of the grating has a radius of curvature in a plane perpendicular to the meridian plane which is less than the radius of curvature in the meridian plane.

19. A scanning monochromator comprising:
a concave reflecting grating having a meridian plane which intersects the reflecting surface of the grating perpendicularly to the lines of the grating with the intersection being an arc of a circle, the grating having a line frequency $N$ which is specified by the law $N = K \sin(74/2,)$ where $K$ is a constant and $\theta$ is the angle subtended at the centre of said circle by the point on the grating in said plane at which the line frequency is being considered and a fixed point on said circle spaced from the grating;
source means for providing electromagentic radiation to irradiate said grating;
radiation receiving means for receiving radiation from said source means which has been diffracted by said grating; and
means for effecting relative movement between said grating, said source means and said radiation receiving means such that given points of said source means and said radiation receiving means always lie on said circle at equal distances from said fixed point on said circle.

20. A scanning monochromator comprising:
a concave reflecting grating having a meridian plane which intersects the reflecting surface of the grating perpendicularly to the lines of the grating with the intersection being an arc of a circle, the grating having a line frequency $N$ which is specified by the law $N = K'(\theta/2)$ and the maximum value of $\theta$ at any point on the grating does not exceed about 10°, where $K'$ is a constant and $\theta$ is the angle subtended at the centre of said circle by the point on the grating in said plane which the line frequency is being considered and a fixed point on said circle spaced from the grating;
source means for providing electromagnetic radiation to irradiate said grating;
radiation receiving means for receiving radiation from said source means which has been diffracted by said grating; and
means for effecting relative movement between said grating, said source means and said radiation receiving means such that given points of said source means and said radiation receiving means always lie on said circle at equal distance from said fixed point on said circle.

* * * * *